United States Patent
Tate, Jr.

(10) Patent No.: US 7,383,154 B2
(45) Date of Patent: Jun. 3, 2008

(54) METHOD FOR ASSESSING MODELS OF VEHICLE DRIVING STYLE OR VEHICLE USAGE MODEL DETECTOR

(75) Inventor: Edward D. Tate, Jr., Grand Blanc, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 253 days.

(21) Appl. No.: 11/302,675

(22) Filed: Dec. 14, 2005

(65) Prior Publication Data

US 2007/0136040 A1   Jun. 14, 2007

(51) Int. Cl.
*G06F 17/18* (2006.01)
*G06F 15/00* (2006.01)
(52) U.S. Cl. ..................................... 702/181
(58) Field of Classification Search .................. 702/181
See application file for complete search history.

(56) References Cited

U.S. PATENT DOCUMENTS

2002/0128751 A1* 9/2002 Engstrom et al. ............... 701/1
2006/0106530 A1* 5/2006 Horvitz et al. ............... 701/117

* cited by examiner

*Primary Examiner*—John Barlow
*Assistant Examiner*—Cindy D. Khuu

(57) ABSTRACT

The present invention relates to a method of determining the probability that a statistical model describes the driving style or usage of a vehicle observed. By identifying an appropriate statistical model, the driving style can be detected and vehicle operation can be optimized. The method may be applied to both hybrid and non-hybrid vehicles. The method may also be augmented to determine the most probable statistical model of the usage of the vehicle. This allows detection of driving styles that can be classified as urban, highway, aggressive, etc. For example, the augmented method can be used to distinguish between highway and urban driving with a very high certainty.

16 Claims, 2 Drawing Sheets

METHOD FOR ASSESSING MODELS OF VEHICLE DRIVING STYLE OR VEHICLE USAGE MODEL DETECTOR

TECHNICAL FIELD

The present invention relates to a method of determining the probability that a statistical model describes the driving style or usage of a vehicle observed.

BACKGROUND OF THE INVENTION

Among the goals for the development of hybrid electric vehicles are improvement of fuel economy and reduction of pollution emissions from automobiles. In designing a hybrid vehicle, fuel economy is maximized with optimized operations and control strategy. A statistical model of driving style can offer optimization of operations for both hybrid and non-hybrid vehicles.

SUMMARY OF THE INVENTION

The present invention relates to a method of determining the probability that a statistical model describes the driving style or usage of a vehicle observed. By identifying an appropriate statistical model, the driving style can be detected and vehicle operation can be optimized. The method may be applied to hybrid and non-hybrid vehicles.

The method of determining the probability that a statistical model describes the driving style of a vehicle observed from time step k to present, also known as the General Algorithm, comprises: (a) establishing at least one statistical model of driving style, wherein the statistical model is a conditional probability model that describes the probability of conditions at the next time step k+1, given conditions at a current time step k; (b) determining initial probability distribution of each statistical model of driving style or vehicle usage; (c) determining probability of an observed transition being predicted by each statistical model of driving style; (d) calculating the probability of the statistical model explaining the driving style of the vehicle observed at a future time step k+1; and wherein said (c) determining the probability of the observed transition and said (d) calculating the probability of said statistical model are iterated for all time steps until present.

In another aspect of the invention, the method may be augmented to determine the most probable statistical model of the driving style of the vehicle. The augmented method is referred to as the Model Detection Algorithm. This allows detection of driving style that can be classified as urban, highway, aggressive, etc. For example, the augmented method can be used to distinguish between highway and urban driving with a very high certainty.

The above objects, features and advantages, and other objects, features and advantages of the present invention are readily apparent from the following detailed description of the best mode for carrying out the invention when taken in connection with the accompanying drawings.

DESCRIPTION OF THE PREFERRED EMBODIMENT

Figure 1:
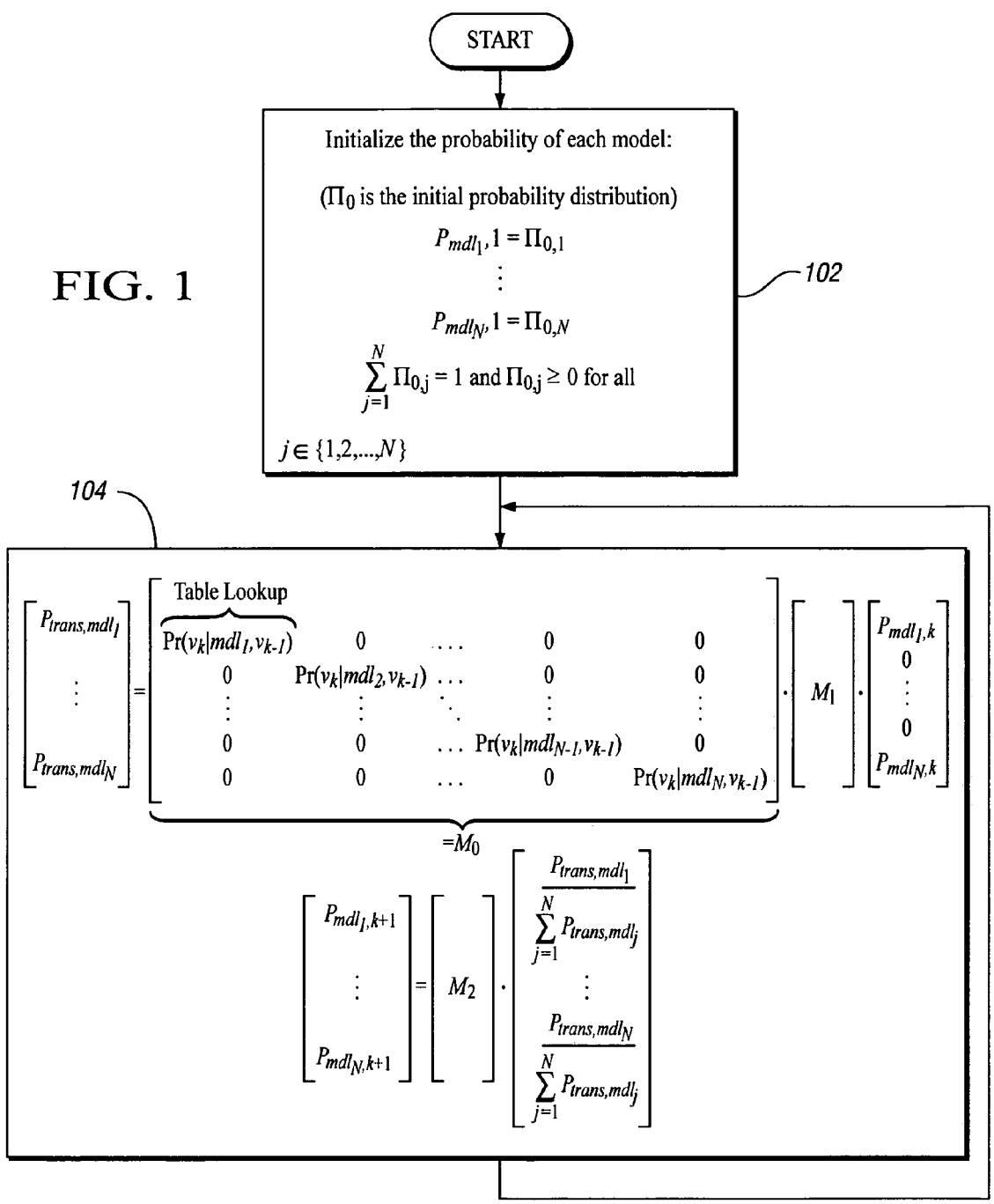
FIG. 1 is a schematic flowchart illustrating the elements of the General Algorithm for describing the driving style of a vehicle observed.

The present invention relates to a method of determining the probability that a statistical model describes the driving style or usage of a vehicle observed. This method is referred to herein as the "General Algorithm." FIG. 1 is a schematic flowchart illustrating the elements of the General Algorithm General Algorithm The method of determining the probability that a statistical model describes the driving style of a vehicle observed from time step k to present comprises: (a) establishing at least one statistical model of driving style, wherein the statistical model is a conditional probability model that describes the probability of conditions at the next time step k+1, given conditions at a current time step k, (b) determining the initial probability distribution of each statistical model of driving style or vehicle usage, shown in box 102; (c) determining the probability of the observed transition being predicted by each statistical model of driving style; (d) calculating the probability of the statistical model explaining the driving style of the vehicle observed at a future time step k+1; and wherein (c) determining the probability of the observed transition and (d) calculating the probability of said statistical model are iterated for all time steps until present. Items (c) and (d) are shown in box 104.

Items (a) through (d) are described below. Items (a) through (d) need not necessarily be executed in the order presented.

The method comprises establishing statistical models of vehicle usage for several driving styles. The statistical models of the vehicle are formed from samples of driving that represent a particular style. These samples include, at a minimum, the velocity of the vehicle over time. However, additional information such as geographic position, time on, road grade and traffic conditions can be considered. From this information, a conditional probability model that describes the probability of conditions at the next time step, given the conditions at the current time step, is built.

Thus each statistical model of driving style is a conditional probability model that describes the probability P at a time step k+1, of having a vehicle velocity $v_{k+1}$, given a vehicle velocity $v_k$ at said time step k.

The method further comprises (b) determining the initial probability distribution of each statistical model of driving style or vehicle usage, i.e., initializing the probability $P_{mdl,1}$ of each statistical model of driving style or vehicle usage, where there are N models. $\Pi_0$ is the initial probability distribution and is pre-determined for each statistical model. $\Pi_0$ is a vector that contains the initial probability of any of the models matching the driving style. In practice, this vector will usually be set to so that each element is equal to 1/N where N is the number of different models that are being detected. In this case, each statistical model would have an equal probability of matching the driving style of the vehicle observed.

$$P_{mdl_1,1} = \Pi_{0,1}$$
$$\vdots$$
$$P_{mdl_N,1} = \Pi_{0,N}$$

Here, $\sum_{j=1}^{N} \Pi_{o,j} = 1$ and $\Pi_{0,j} \geq 0$ for all $j \in \{1, 2, \ldots, N\}$ The method further comprises (c) determining the probability of the observed transition $P_{trans\ mdl}$ being predicted by each statistical model of driving style or vehicle usage, from the first model to the Nth model. A reference table look up is employed. A table look-up is a two dimensional reference matrix or array that is developed for and unique to each statistical model of driving usage. The table look-up functions as an input to the General Algorithm and has three independent indices; an index identifying the particular statistical model of driving usage (1–N), current velocity and previous velocity. $M_0 (v_k, vk_{k-1})$ represents the left-most matrix on the right side of the equation.

$$\begin{bmatrix} P_{trans,mdl_1} \\ \vdots \\ P_{trans,mdl_N} \end{bmatrix} = \underbrace{\begin{bmatrix} \overbrace{Pr(v_k \mid mdl_1, v_{k-1})}^{Table\ Lookup} & 0 & \ldots & 0 & 0 \\ 0 & Pr(v_k \mid mdl_2, v_{k-1}) & \ldots & 0 & 0 \\ \vdots & \vdots & \ddots & \vdots & \vdots \\ 0 & 0 & \ldots & Pr(v_k \mid mdl_{N-1}, v_{k-1}) & 0 \\ 0 & 0 & \ldots & 0 & Pr(v_k \mid mdl_N, v_{k-1}) \end{bmatrix}}_{=M_O} \cdot [M_1] \cdot \begin{bmatrix} P_{mdl_1,k} \\ \vdots \\ P_{mdl_N,k} \end{bmatrix}$$

The method further comprises (d) calculating the probability of any given model explaining the behavior observed to present. Thus the probability of each model, from the first model to the Nth model, explaining the driving style of the vehicle at time step k+1 is calculated.

$$\begin{bmatrix} P_{mdl_1,k+1} \\ \vdots \\ P_{mdl_N,k+1} \end{bmatrix} = [M_2] \cdot \begin{bmatrix} \dfrac{P_{trans,mdl_1}}{\sum_{j=1}^{N} P_{trans,mdl_j}} \\ \vdots \\ \dfrac{P_{trans,mdl_N}}{\sum_{j=1}^{N} P_{trans,mdl_j}} \end{bmatrix}$$

The method further comprises the iteration of (c) determining the probability of the observed transition and (d) calculating the probability of said statistical model, for all time steps until present. Thus the $P_{mdl,k+1}$ vector determined in (d) replaces the $P_{mdl,k}$ vector in (c), when (c) is repeated.

Calibration of General Algorithm

The algorithm may be calibrated using $M_0(v_k, v_{k-1})$, $M_1$, $M_2$ and $\Pi_0$. $\Pi_0$, is employed in (a). $M_0 (v_k, v_{k-1})$ and $M_1$ are employed in (c). $M_2$ is employed in (d).

$M_0(v_k, v_{k-1})$ defines the probability of transitioning from one velocity to another in each model. This matrix function is calibrated based on driving data used to build the conditional models. $M_1$ and $M_2$ are matrices used to define the probability of transitioning from one driving style to another at each sample. $M_1$ and $M_2$ are Markov Matrices. Thus, every element in $M_1$ and $M_2$ matrices are non-negative and the sum of any row is 1. Markov models are a class of statistical models where the output of the system at a future time is determined by the current state of the system.

Both $M_1$ and $M_2$ can be identity matrices, which would indicate that there is no probability of transitioning from one style to another once the vehicle is started. If one matrix is not the identity matrix, in practice, the other matrix will be the identity matrix, although this is not required.

$M_1$, $M_2$ and $\Pi_0$ can be used to specify probable sequences of driving styles. For example, $\Pi_0$ can be set up to disallow highway driving at key on. Once a city driving style has been detected, then $M_1$ or $M_2$ can permit a transition to detecting a highway driving style.

Model Detection Algorithm

In another aspect of the invention, the General Algorithm may be augmented to determine the most probable statistical model of the usage of the vehicle. This allows detection of driving styles that can be classified as urban, highway, aggressive, etc. For example, this augmented algorithm can be used to distinguish between highway and urban driving with a very high certainty.

Figure 2:
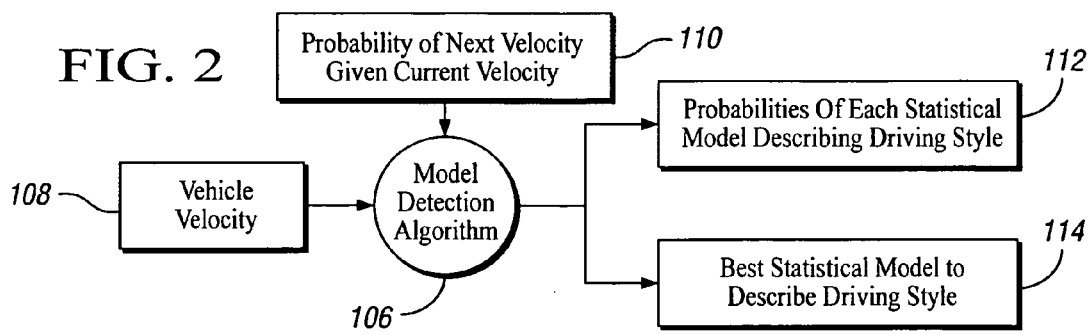
FIG. 2 is a schematic flowchart illustrating the inputs and outputs to the Model Detection Algorithm.

This method is referred to herein as the "Model Detection Algorithm." Referring to FIG. 2, a schematic flowchart of the inputs and outputs to the Model Detection Algorithm 106 is shown. The Model Detection Algorithm 106 has the following as inputs: current vehicle velocity, shown in box 108; and probability of next velocity given current velocity, shown in box 110. The Model Detection Algorithm 106 has the following as outputs: probabilities of each statistical model describing driving style, shown in box 112; and the best statistical model to describe driving style i.e., the statistical model with the highest probability of describing the driving style observed, shown in box 114.

Figure 3:
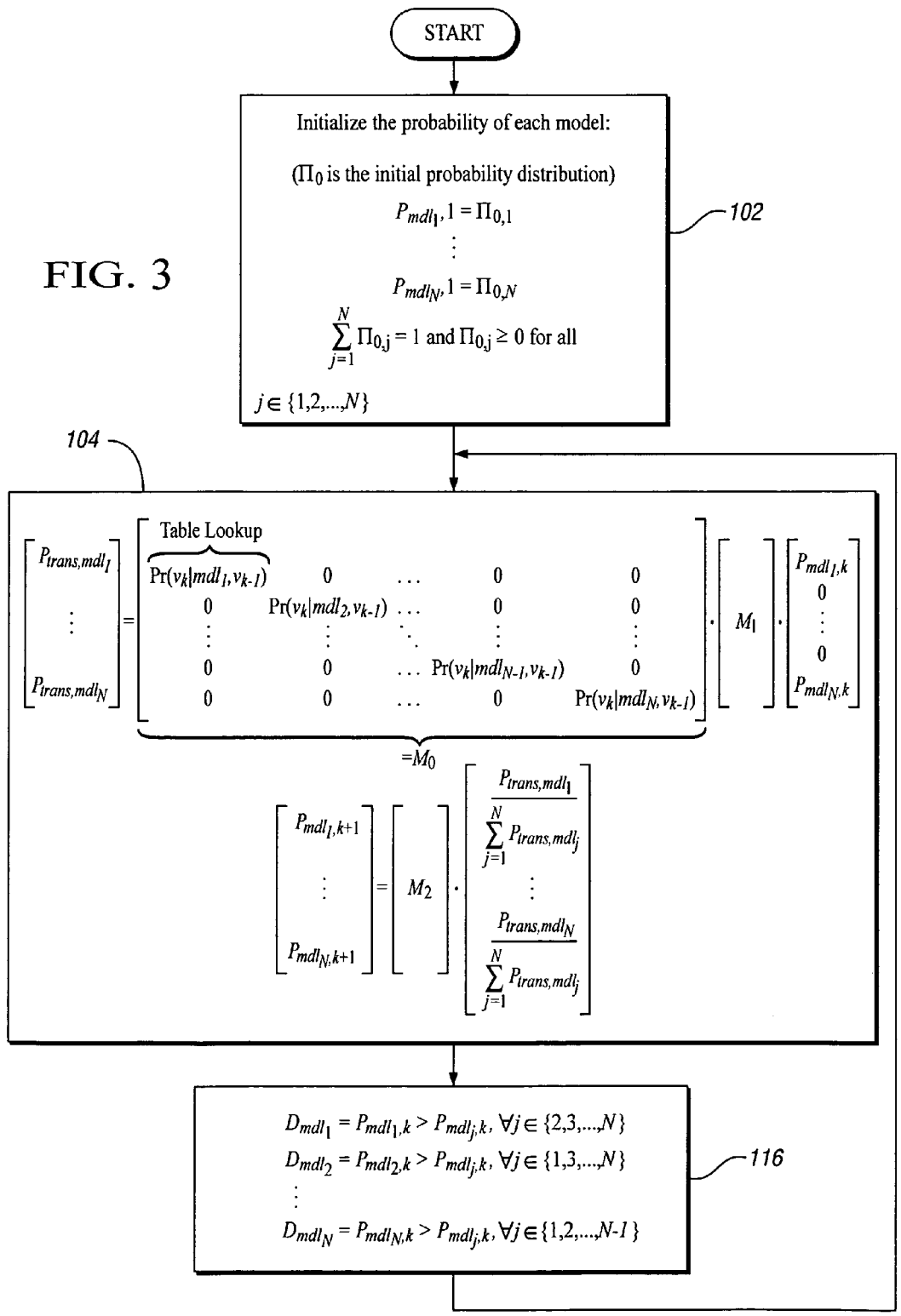
FIG. 3 is a schematic flowchart illustrating the elements of the Model Detection Algorithm.

FIG. 3 is a schematic flowchart illustrating the elements of the Model Detection Algorithm. The method of Model Detection or determining the most probable statistical model of driving style of a vehicle observed from time step k to present comprises: (a) establishing at least one statistical model of driving style, wherein the statistical model is a conditional probability model that describes the probability of conditions at the next time step k+1, given conditions at a current time step k, (b) determining the initial probability distribution of each statistical model of driving style or vehicle usage, shown in box 102; (c) determining the probability of the observed transition being predicted by each statistical model of driving style; (d) calculating the probability of the statistical model explaining the driving style of the vehicle observed at a future time step k+1; wherein said (c) determining the probability of the observed transition and said (d) calculating the probability of said statistical model are iterated for all time steps until present; and (e) determining which of the N statistical models has the highest probability of explaining the driving style observed. Items (c) and (d) are shown in box 104, while item (e) is shown in box 116. Items (a) through (d) are as described above for the General Algorithm. Items (a) through (d) need not necessarily be executed in the order presented.

The statistical model determined in (e), which has the highest probability $P_{mdl,k}$ of explaining the driving style observed, is the detected model.

$$D_{mdl_1} = P_{mdl_1,k} > P_{mdl_j,k} \quad \forall j \in \{2,3,\ldots,N\}$$

$$D_{mdl_2} = P_{mdl_2,k} > P_{mdl_j,k} \quad \forall j \in \{1,3,\ldots,N\}$$

.
.
.

$$D_{mdl_N} = P_{mdl_N,k} > P_{mdl_j,k} \quad \forall j \in \{1,2,\ldots,N-1\}$$

Special Cases of $\Pi_0$:

A special case of where the initial probability distribution of every model is equal results in: $\Pi_0 = [1/N \ 1/N \ \ldots \ 1/N]_T$. Another special case is where one specific model is not possible, for example, it is not possible for model 2 to describe the system. This results in: $\Pi_0 = [1/(N-1) \ 0 \ 1/(n-1) \ \ldots \ 1/(N-1)]_T$. T represents a transposed matrix in both instances.

Special Cases of $M_1$ and $M_2$:

Where $p_1$ is the probability of changing or transitioning to a different driving style and $p_2$ is the probability of staying with the same driving style, both prior to detection or (c) in the General Algorithm:

$$p_1, p_2 = 1 - p_1, M_1 = I,$$

$$M_2 = \begin{bmatrix} p_2 & \left(\frac{p_1}{N-1}\right) & \cdots & \left(\frac{p_1}{N-1}\right) & \left(\frac{p_1}{N-1}\right) \\ \left(\frac{p_1}{N-1}\right) & p_2 & \cdots & \left(\frac{p_1}{N-1}\right) & \left(\frac{p_1}{N-1}\right) \\ \vdots & \vdots & & \vdots & \vdots \\ \left(\frac{p_1}{N-1}\right) & \left(\frac{p_1}{N-1}\right) & \cdots & p_2 & \left(\frac{p_1}{N-1}\right) \\ \left(\frac{p_1}{N-1}\right) & \left(\frac{p_1}{N-1}\right) & \cdots & \left(\frac{p_1}{N-1}\right) & p_2 \end{bmatrix}$$

Where $p_1$ is the probability of changing or transitioning to a different driving style and $p_2$ is the probability of staying with the same driving style, both prior to updating of the probability distribution in (d) of the General Algorithm:

$$p_1, p_2 = 1 - p_1,$$

$$M_1 = \begin{bmatrix} p_2 & \left(\frac{p_1}{N-1}\right) & \cdots & \left(\frac{p_1}{N-1}\right) & \left(\frac{p_1}{N-1}\right) \\ \left(\frac{p_1}{N-1}\right) & p_2 & \cdots & \left(\frac{p_1}{N-1}\right) & \left(\frac{p_1}{N-1}\right) \\ \vdots & \vdots & & \vdots & \vdots \\ \left(\frac{p_1}{N-1}\right) & \left(\frac{p_1}{N-1}\right) & \cdots & p_2 & \left(\frac{p_1}{N-1}\right) \\ \left(\frac{p_1}{N-1}\right) & \left(\frac{p_1}{N-1}\right) & \cdots & \left(\frac{p_1}{N-1}\right) & p_2 \end{bmatrix}, M_2 = I$$

Where there is no change in driving model expected, $M_1$ and $M_2$ are identity matrices: $M_1 = I$, $M_2 = I$ Other Variations of the Algorithm In addition to using only velocity v for the statistical model, enhanced versions of this method or algorithm can use other inputs to the conditional probability models.

For example, a conditional probability model ($Pr(T_{k+1}|v_k, T_k)$) can be formed using torque, in addition to velocity, as the inputs to the algorithm. Here $T_{k+1}$ is the torque at time step k+1, $v_k$ is the velocity at previous time step k and $T_k$ is the torque at time step k.

A conditional probability model $Pr(v_{k+1}|v_k, S_k)$ can be formed using velocity and statistical groups as the inputs. Here $S_k$ is a summary variable that maps previously observed driving behavior to a finite set. Each element in this set represents statistically similar driving behavior i.e., $S_k: [v_k, v_{k-1}, \ldots, v_1] \rightarrow \{1,2,\ldots,M\}$.

A conditional probability model $Pr(v_{k+1}|v_k, G_k)$ can be formed using velocity and geographic location as the inputs. Here $G_k$ is a variable that describes the physical location of the vehicle.

Furthermore, all combinations of velocity, torque, acceleration, road grade, time of day, physical location (e.g. GPS), vehicle load, passenger count and seating, transmission gear, driver identification, key, special vehicle mode, and so on, can be used as inputs in a conditional probability model. The same variables may be grouped into statistical clusters and used in a conditional probability model.

Applications of the Algorithm

The method of determining the probability that a statistical model describes the driving style of a vehicle observed from time step k to present, as described above, may be applied to improve fuel economy in a hybrid vehicle. At least one operating parameter of the vehicle may be controlled based upon the statistical model of driving style observed, in a manner to improve fuel economy at the next time step k+1. The controllable operating parameters of the vehicle include calibrations associated with power-split controls and other suitable parameters. The power-split controls affect the ratio of battery power and engine power used in the instant of time. The ratio of battery power and engine power used in a hybrid vehicle in a specific time step impacts upon fuel economy.

By detecting a statistical model of a driver's style, the control law in a hybrid electric vehicle can be fine tuned, offering further improved fuel economy. This fine tuning provides the benefits of adaption, without requiring adaption or a mechanism for feed-forward controls. For example, a simple adaption scheme in hybrid electric vehicles is to estimate the average speed over an exponential forgetting window. This typically involves long time constants and results in a real number. The results of this adaptation are a very large number of possible driving styles. Using this scheme, the style of driving is isolated to a finite, and small, set of possible driving styles.

The method or algorithm in the present invention can be used with hybrid electric vehicle control algorithms previously proposed and improve on their performance by identifying when the vehicle is driven in a significantly different manner.

Additionally, this algorithm is part of a control technique for hybrid electric vehicles. A control synthesis technique known as Stochastic Dynamic Programming (SDP) can be used to design high level strategies for engine and battery management. SDP relies on a statistical description of the inputs to the system (e.g. torque request). The particular statistical description used is known as a Markov Model. Given this Markov Model, an optimal control law can be synthesized. One of the opportunities in this technique is to take advantage of the maximum amount of information for optimal operation. This detection algorithm allows this by distinguishing between different driving styles.

This method or algorithm presented is computationally efficient and uses a minimum amount of memory. For example, in an implementation that detects seven different driving styles, only sixteen floating point variables are used. Only eight variables are required to maintain the state of the estimator. The method or algorithm looks for 'landmarks' or specific events, and does not depend on 'key on' time i.e., how long the vehicle has been on.

Other Possible Uses and Adaptions

The method or algorithms described above may also be applied to non-hybrid vehicles. This algorithm can be adapted to detect a best statistical model of exogenous (external) inputs to any system i.e., a set of statistics that best describes the inputs and outputs of the system. All that is required is to identify sample time histories, identify the inputs, group those inputs into detectable groups or bins, build a statistical model (i.e. Markov Model) and implement the detector algorithm. A sample time history could be a second by second previous history sample of torque or velocity.

An application of the method in the present invention includes aid in scheduling diagnostics tests. For example, a statistical model of future inputs to the system can be used to determine appropriate times to start intrusive tests. For example, a family of statistical models of manifold pressure could be formulated. Of these statistical models, one would be the model that best identifies when to start an exhaust gas recirculation (EGR) valve test. The detector could then be used to determine when that model is most probably active and used to trigger the test.

Other applications of the method in the present invention include selection of optimal gain settings or Gain Scheduling Controls. When we have a controller that must react to an input that does not follow a simple behavior (for example, step input, ramp input, etc.) this method can be used to identify the most probable input and allow selection of gains that result in optimal operation. For example, this technique could be used to identify specific maneuvers and select appropriate compensations. In suspension and stability systems, this method could be used to identify most likely statistical models of the road and near environment.

While the best mode for carrying out the invention has been described in detail, those familiar with the art to which this invention relates will recognize various alternative designs and embodiments for practicing the invention within the scope of the appended claims.

The invention claimed is:

1. A method of determining the probability that a statistical model describes the driving style of a vehicle observed from time step k to present, said method comprising:
   (a) establishing at least one statistical model of driving style, wherein said at least one statistical model is a conditional probability model that describes probability of conditions at a next time step k+1, given conditions at said time step k;
   (b) determining initial probability distribution of said at least one statistical model of driving style,
      wherein said (b) determining the initial probability distribution of said at least one statistical model comprises setting vector $\Pi_0$ as the initial probability distribution wherein said vector $\Pi_0$ is re-determined for each said at least one statistical model;
   (c) determining probability of an observed transition being predicted by said at least one statistical model of driving style;
   (d) calculating probability of said at least one statistical model explaining driving style of said vehicle observed at said next time step k+1; and
   wherein said (c) determining the probability of said observed transition and said (d) calculating probability of said at least one statistical model are iterated for all time steps until present.

2. The method of claim 1, wherein said statistical model of driving style is a conditional probability model that describes the probability P at a time step k+1, of having a vehicle velocity $V_{k+1}$, given a vehicle velocity $V_k$ at said time step k.

3. The method of claim 2:
   wherein said statistical model of driving style is formed from a sample of driving that represents said driving style; and wherein said sample comprises velocity of said vehicle over time.

4. The method of claim 1, wherein said statistical model of driving style is a conditional probability model that describes the probability P at a time step k+1, of a vehicle with specific velocity, torque, acceleration, road grade, physical location, vehicle load, passenger count and seating, transmission gear, driver identification, key, or special vehicle mode, given the respective factors at said time step k.

5. The method of claim 1, wherein there are N statistical models of driving style:
   wherein each element of said vector $\Pi_0$ set to 1/N, whereby said statistical model has an equal probability of matching driving style of said vehicle observed.

6. The method of claim 1, further comprising:
   (e) controlling at least one operating parameter of the vehicle based upon said at least one statistical model of driving style in a manner to improve fuel economy at said next time step k+1.

7. The A method of determining the probability that a statistical model describes the driving style of a vehicle observed from time step k to present, said method comprising:
   (a) establishing at least one statistical model of driving style, wherein said at least one statistical model is a conditional probability model that describes probability of conditions at a next time step k+1, given conditions at said time step k;
   (b) determining initial probability distribution of said at least one statistical model of driving style;
   (c) determining probability of an observed transition being predicted by said at least one statistical model of driving style;
   (d) calculating probability of said at least one statistical model explaining driving style of said vehicle observed at said next time step k+1;
   wherein said (c) determining the probability of said observed transition and said (d) calculating probability of said at least one statistical model are iterated for all time steps until present; and
   wherein said (c) determining the probability of the observed transition being predicted by said statistical model of driving style includes:
      employing a reference table look up, wherein said table look-up is a two dimensional matrix developed for each said statistical model, wherein there are N said statistical models of driving style, wherein said table look-up has three independent indices; an index identifying said statistical model, current velocity and previous velocity of said vehicle observed; and employing a pre-determined matrix $M_1$ to define probability of transitioning from one driving style to another at each sample, wherein $M_1$ is a Markov matrix.

8. The method of claim 7, wherein said (c) calculating the probability of said statistical model explaining driving style of said vehicle observed at time step k+1 comprises:

employing a pre-determined matrix $M_2$ to define probability of transitioning from one driving style to another at each sample, wherein $M_2$ is a Markov matrix.

9. The method of claim 8, wherein there is no change in driving model expected:

wherein $M_1$ is an identity matrix; and wherein $M_2$ is an identity matrix.

10. A method of determining the most probable statistical model of driving style of a vehicle observed from time step k to present, said method comprising:

(a) establishing at least two statistical models of driving style, wherein said at least two statistical models are conditional probability models that describe probability of conditions at a next time step k+1, given conditions at said time step k;

(b) determining initial probability distribution of said at least two statistical models of driving style, wherein said (b) determining the initial probability distribution of said at least two statistical models comprises setting vector $\Pi_0$ as the initial probability distribution, wherein said vector $\Pi_0$ is pre-determined for each of said at least two statistical models;

(c) determining probability of an observed transition being predicted by said at least two statistical models of driving style;

(d) calculating probability of said at least two statistical models explaining driving style of said vehicle observed at said next time step k+1; and wherein said (c) determining the probability of said observed transition and said (d) calculating probability of said at least two statistical models are iterated for all time steps until present; and (e) determining which of said at least two statistical models has the highest probability of explaining the driving style observed.

11. The method of claim 10, wherein said statistical model of driving style is a conditional probability model that describes the probability P at a time step k+1, of having a vehicle velocity $V_{k+1}$, given a vehicle velocity $V_k$ at said time step k.

12. The method of claim 10:

wherein said statistical model of driving style is formed from a sample of driving that represents said driving style; and wherein said sample comprises velocity of said vehicle over time.

13. The method of claim 10, wherein said statistical model of driving style is a conditional probability model that describes the probability P at a time step k+1, of a vehicle with specific velocity, torque, acceleration, road grade, physical location, vehicle load, passenger count and seating, transmission gear, driver identification, key, or special vehicle mode, given the respective factors at said time step k.

14. The method of claim 10, wherein there are N statistical models of driving style:

wherein each element of said vector $\Pi_0$ set to 1/N, whereby each statistical model has an equal probability of matching driving style of said vehicle observed.

15. The method of claim 10, wherein said (c) determining the probability of the observed transition being predicted by each statistical model of driving style comprises:

employing a reference table look up, wherein said table look-up is a two dimensional matrix developed for each said statistical model, wherein there are N statistical models of driving style, wherein said table look-up has three independent indices; an index identifying said statistical model, current velocity and previous velocity of said vehicle observed; and employing a pre-determined matrix $M_1$ to define the probability of transitioning from one driving style to another at each sample, wherein $M_1$ is a Markov matrix.

16. The method of claim 15, wherein said (c) calculating the probability of said statistical model explaining driving style of said vehicle observed at time step k+1 comprises:

employing a pre-determined matrix $M_2$ to define the probability of transitioning from one driving style to another at each sample, wherein $M_2$ is a Markov matrix.

* * * * *